(12) United States Patent
Shimada et al.

(10) Patent No.: US 10,525,618 B2
(45) Date of Patent: Jan. 7, 2020

(54) CONTROLLER OF ROTARY COMPRESSION-MOLDING MACHINE

(71) Applicant: KIKUSUI SEISAKUSHO LTD., Kyoto-shi (JP)

(72) Inventors: Satoshi Shimada, Kyoto (JP); Katsuhito Fujisaki, Kyoto (JP); Toshihiro Nakaoka, Kyoto (JP)

(73) Assignee: KIKUSUI SEISAKUSHO LTD., Kyoto-Shi, Kyoto (JP)

(*) Notice: Subject to any disclaimer, the term of this patent is extended or adjusted under 35 U.S.C. 154(b) by 381 days.

(21) Appl. No.: 15/436,477

(22) Filed: Feb. 17, 2017

(65) Prior Publication Data
US 2017/0266853 A1 Sep. 21, 2017

(30) Foreign Application Priority Data
Mar. 16, 2016 (JP) ................................. 2016-052950

(51) Int. Cl.
*B29C 43/58* (2006.01)
*B29C 43/08* (2006.01)

(52) U.S. Cl.
CPC .............. *B29C 43/58* (2013.01); *B29C 43/08* (2013.01); *B29C 2043/585* (2013.01); *B29C 2043/5833* (2013.01)

(58) Field of Classification Search
CPC . B29C 43/58; B29C 43/08; B29C 2043/5833; B29C 2043/585; B30B 11/005; B30B 11/08; B30B 15/26; B30B 15/32
See application file for complete search history.

(56) References Cited

U.S. PATENT DOCUMENTS 5,085,515 A * 2/1992 Itoh ...................... B07C 5/3408
250/223 B
2007/0251596 A1* 11/2007 Scherzer ................... B01F 3/18
141/2
(Continued)

FOREIGN PATENT DOCUMENTS

EP 2 036 707 A2 3/2009
JP 2006-298526 A 11/2006
(Continued)

OTHER PUBLICATIONS

"Tablet/capsule metal detector", Acuraks, Inc., (online), 2010, Acuraks, Inc., (searched on Feb. 19, 2016), Internet <URL: http://www.acuraks.com/products/safeline/safeline_tablex_pro.html>.

*Primary Examiner* — Anthony Calandra
*Assistant Examiner* — Jamel M Nelson
(74) *Attorney, Agent, or Firm* — McGinn I.P. Law Group, PLLC.

(57) ABSTRACT

A controller of a rotary compression-molding machine is configured to detect, with a sensor, an amount of stuck molded products or a flow rate of molded products at an inlet configured to receive a molded product or an outlet configured to discharge the molded product subjected to predetermined post-treatment, of a peripheral device disposed downstream of the molding machine and is further configured to apply the post-treatment to the molded product discharged from the molding machine, and to regulate a rotational speed of a turret and punches of the molding machine in accordance with the detected amount of the stuck molded products or the detected flow rate of the molded products.

20 Claims, 5 Drawing Sheets

(56) References Cited

U.S. PATENT DOCUMENTS

| | | | |
|---|---|---|---|
| 2009/0074900 A1* | 3/2009 | Meier | B30B 11/005 |
| | | | 425/173 |
| 2010/0078841 A1 | 4/2010 | Herrmann et al. | |
| 2012/0061869 A1* | 3/2012 | Boeckx | A61J 3/10 |
| | | | 264/40.1 |
| 2012/0135100 A1 | 5/2012 | Uneme | |

FOREIGN PATENT DOCUMENTS

| | | | |
|---|---|---|---|
| JP | 2006298526 A | * | 11/2006 |
| JP | 2011-245107 A | | 12/2011 |
| JP | 2012-110961 A | | 6/2012 |
| JP | 2016-010437 A | | 1/2016 |

* cited by examiner

CONTROLLER OF ROTARY COMPRESSION-MOLDING MACHINE

BACKGROUND

There has been known a rotary compression-molding machine including a table of a turret having die bores, an upper punch and a lower punch slidably retained above and below each of the die bores, and configured to horizontally rotate the die bores and the punches together to compression-mold a powdery material filled in the die bores when the paired upper and lower punches pass between an upper roll and a lower roll (see, for example, JP 2012-110961 A).

Each molded product of the compression-molding machine is occasionally subjected to post-treatment such as removing a powdery material adhering to the surface, printing or engraving on the surface, or detecting any metal piece erroneously included in the molded product. Such post-treatment is conducted by a peripheral device like a brushing powdery material remover (see, for example, JP 2006-298526 A), an air jetting powdery material remover (see, for example, JP 2011-245107 A), a printer (see, for example, JP 2016-010437 A), or a metal detector (see, for example, "Tablet/capsule metal detector", Acuraks, Inc., (online), 2010, Acuraks, Inc.

SUMMARY OF THE INVENTION

In a case where a peripheral device configured to conduct post-treatment is disposed downstream of a compression-molding machine in order for continuous molding to post-treatment of molded products with no interruption, and discharge of the molded products by the molding machine and treatment of the molded products by the peripheral device are different in speed, the molded products can be stuck and overflown at a molded product inlet of the peripheral device.

Furthermore, tableting speed or speed of compression-molding a powdery material by the molding machine influences a quality of a molded product of the molding machine. For example, too fast a tableting speed is likely to cause capping or separation of the upper or lower end of a molded product, and lamination or layered separation at the intermediate portion of a molded product. In contrast, too slow a tableting speed is likely to cause binding or cracking in the side surface of a molded product due to friction with the inner circumferential surface of the die bore, and sticking or adhesion of a separated part of a powdery material for a molded product to the punch end surface.

The invention has been achieved in view of such problems, and an exemplary feature thereof is to inhibit molded products from being stuck or overflown in a continuous processing system including a rotary compression-molding machine and a peripheral device disposed downstream of the molding machine and/or maintain a quality of the molded products.

In order to achieve the exemplary feature mentioned above, the invention provides a controller of a rotary compression-molding machine configured to rotate a turret including a table having a die bore, and punch retaining portions vertically slidably retaining punches disposed above and below the die bore along with the punches to compress a powdery material filled in the die bore with the punches and obtain a molded product, the controller being configured to detect, with a sensor, an amount of stuck molded products or a flow rate of molded products at an inlet configured to receive a molded product or an outlet configured to discharge the molded product subjected to predetermined post-treatment, of a peripheral device disposed downstream of the molding machine and configured to apply the post-treatment to the molded product discharged from the molding machine, and regulate a rotational speed of the turret and the punches of the molding machine in accordance with the detected amount of the stuck molded products or the detected flow rate of the molded products.

More specifically, the controller according to an exemplary aspect is configured to reduce the rotational speed of the turret and the punches of the molding machine as the amount of the stuck molded products is larger at the inlet or the outlet of the peripheral device, or reduce the rotational speed of the turret and the punches of the molding machine when the amount of the stuck molded products exceeds a predetermined amount at the inlet or the outlet of the peripheral device in comparison to a case where the amount does not exceed the predetermined amount.

The invention also provides a controller of a rotary compression-molding machine configured to rotate a turret including a table having a die bore, and punch retaining portions vertically slidably retaining punches disposed above and below the die bore along with the punches to compress a powdery material filled in the die bore with the punches and obtain a molded product, the controller being configured to regulate the rotational speed of the turret and the punches of the molding machine in accordance with quality of the molded product discharged from the molding machine.

A powdery material is an aggregate of minute solids and conceptually includes an aggregate of particles such as so-called "granules" and an aggregate of powder smaller than such particles.

The invention achieves inhibiting molded products from being stuck or overflown in a continuous processing system including a rotary compression-molding machine and a peripheral device disposed downstream of the molding machine and/or maintaining quality of the molded products.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Described below is an exemplary embodiment of the invention with reference to the drawings. Initially, an entire outline of a rotary compression-molding machine A (hereinafter, referred to as the "molding machine A") will be described. As shown exemplarily in FIG. 1, the molding machine A has a frame 1 including an upright shaft 2 functioning as a rotary shaft, and a turret 3 is attached to a connection portion 21 that is disposed at the top of the upright shaft 2.

The turret 3 horizontally rotates (e.g., spins) about the upright shaft 2. The turret 3 includes a table (e.g., a die disc) 31, an upper punch retaining portion 32, and a lower punch retaining portion 33. As shown exemplarily in FIG. 2, the table 31 has a substantially circular disc shape, and a plurality of die bores 4 is formed in an outer circumferential portion thereof so as to be aligned in a direction of rotation and be spaced apart from each other at predetermined intervals. The die bores 4 each penetrate the table 31 in the vertical direction. The table 31 may include a plurality of divided plates. Instead of forming the die bores 4 by directly drilling the table 31, the table 31 alternatively has a plurality of die members that is separate from the table 31 and is detachably attached thereto. In this case, each of the die members alternatively has a die bore penetrating in the vertical direction.

Figure 2:
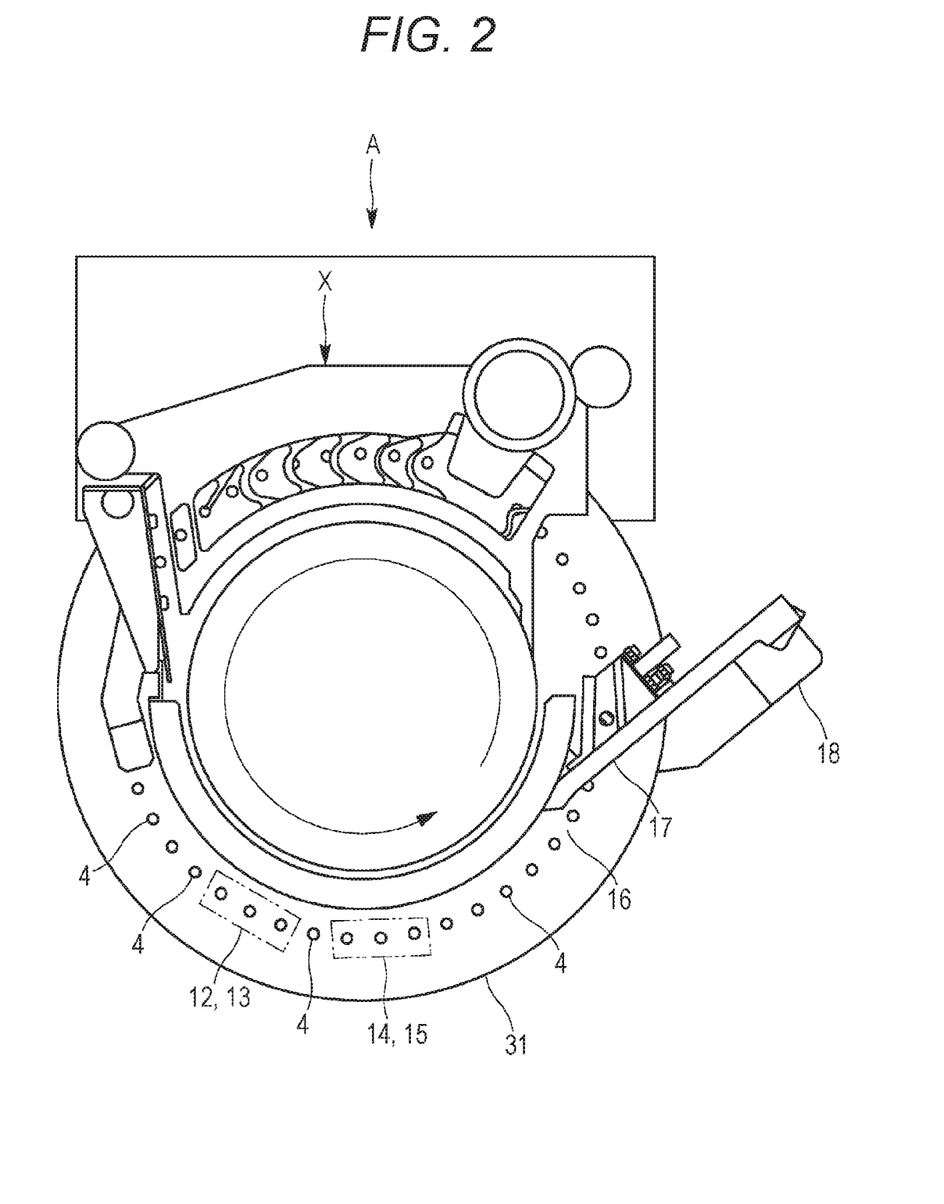
FIG. 2 is a top view of a turret of the rotary compression-molding machine according to the exemplary embodiment.

An upper punch 5 and a lower punch 6 are disposed above and below each of the die bores 4. The upper punches 5 and the lower punches 6 are retained by the upper punch retaining portion 32 and the lower punch retaining portion 33 so as to be independently slidable in the vertical direction in the die bores 4. The upper punches 5 each have a tip 53 that enters and exits corresponding one of the die bores 4. The lower punches 6 each have a tip 63 that is always inserted in a corresponding one of the die bores 4. The upper punches 5 and the lower punches 6 horizontally rotate (e.g., revolve) about the upright shaft 2 along with the turret 3 and the die bores 4.

Figure 1:
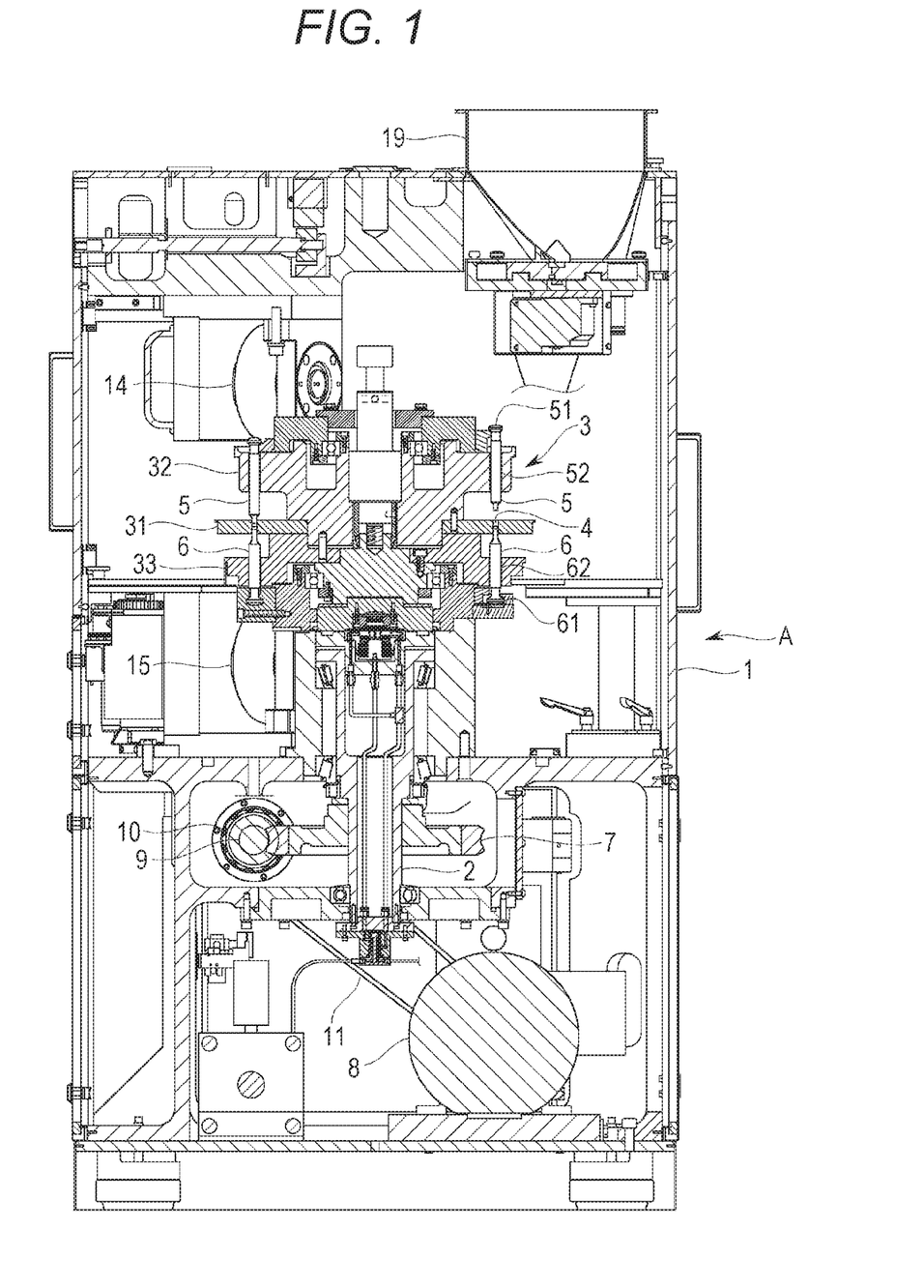
FIG. 1 is a side sectional view of a rotary compression-molding machine according to an exemplary embodiment of the invention.

The upright shaft 2 has the lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 by way of a belt 11, so as to drive and to rotate the upright shaft 2 by way of the worm gear 10 and the worm wheel 7, and further to rotate the turret 3 and the punches 5 and 6.

A powdery material or a raw material for a compression-molded product such as a pharmaceutical tablet is filled in the die bores 4 via a feeder X. The feeder X can be of either an agitated feeder or a gravity feeder. The powdery material is fed to the feeder X with use of a powdery material feeding device. The powdery material is fed to the powdery material feeding device via a hopper 19. The hopper 19 is detachably attached to the molding machine A.

Figure 3:
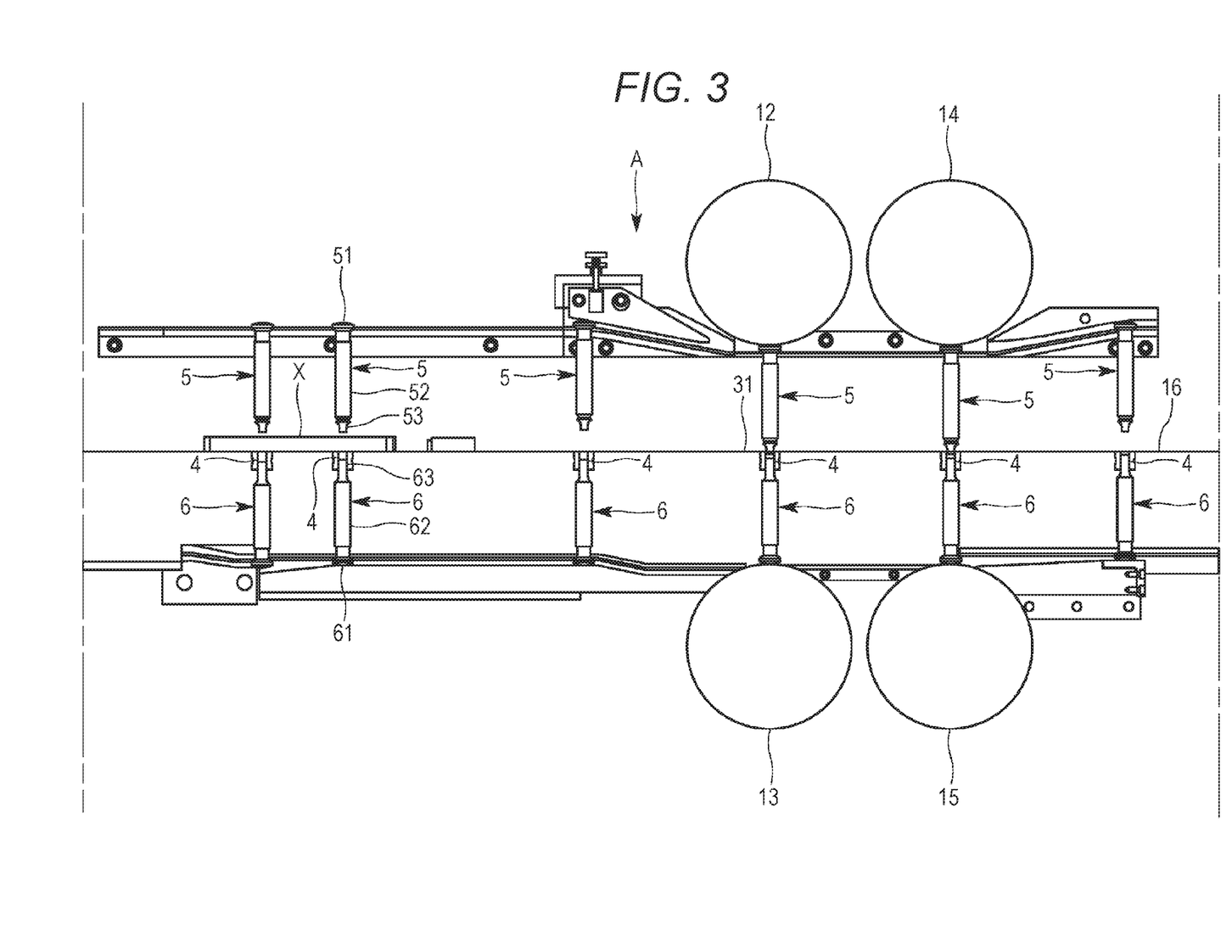
FIG. 3 is a developed view showing a flow of molding a molded product by the rotary compression-molding machine according to the exemplary embodiment and a vertical shift of punches along with rotation of the turret.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13, as well as the substantial compression upper roll 14 and the substantial compression lower roll 15, are respectively paired in the vertical direction so as to sandwich the punches 5 and 6. The preliminary compression upper roll 12 and the preliminary compression lower roll 13, as well as the substantial compression upper roll 14 and the substantial compression lower roll 15, respectively bias the upper and lower punches 5 and 6 to bring the upper and lower punches 5 and 6 close to each other, so that distal end surfaces of the tips 53 and 63 compress from above and below a powdery material filled in each of the die bores 4.

The upper and lower punches 5 and 6 have heads 51 and 61 pressed by the rolls 12, 13, 14, and 15, and trunks 52 and 62 smaller in diameter than the heads 51 and 61. The upper punch retaining portion 32 of the turret 3 vertically slidably retains the trunks 52 of the upper punches 5, whereas the lower punch retaining portion 33 vertically slidably retains the trunks 62 of the lower punches 6. The tips 53 and 63 of the trunks 52 and 62 are thinner than the remaining portions and are substantially equal in diameter to the inner diameter of the die bores 4 so as to be inserted to the die bores 4. Revolution of the punches 5 and 6 causes the rolls 12, 13, 14, and 15 to become close to the heads 51 and 61 of the punches 5 and 6 and step onto and contact the heads 51 and 61. The rolls 12, 13, 14, and 15 further press the upper punches 5 downward and press the lower punches 6 upward. While the rolls 12, 13, 14, and 15 are in contact with flat top surfaces of the punches 5 and 6, the punches 5 and 6 keep applying constant pressure to the powdery material in the corresponding die bore 4.

A molded product unloading portion 16 is provided ahead, in the direction of rotation of the turret 3 and the punches 5 and 6, of the position where the substantial compression upper roll 14 and the substantial compression lower roll 15 apply pressure. At the molded product unloading portion 16, the lower punch 6 ascends until the upper end surface of the tip 63 of the lower punch 6 reaches the height substantially same as that of the upper end of the die bore 4 (i.e., the upper surface of the table 31). The lower punch 6 then pushes the molded product out of the die bore 4. The molded product unloading portion 16 has a guide member 17 that guides the molded product pushed out of the die bore 4. The molded product extracted from the die bore 4 is brought into contact with the guide member 17 due to the rotation of the turret 3, and is shifted along the guide member 17 toward a molded products collecting position 18.

Figure 4:
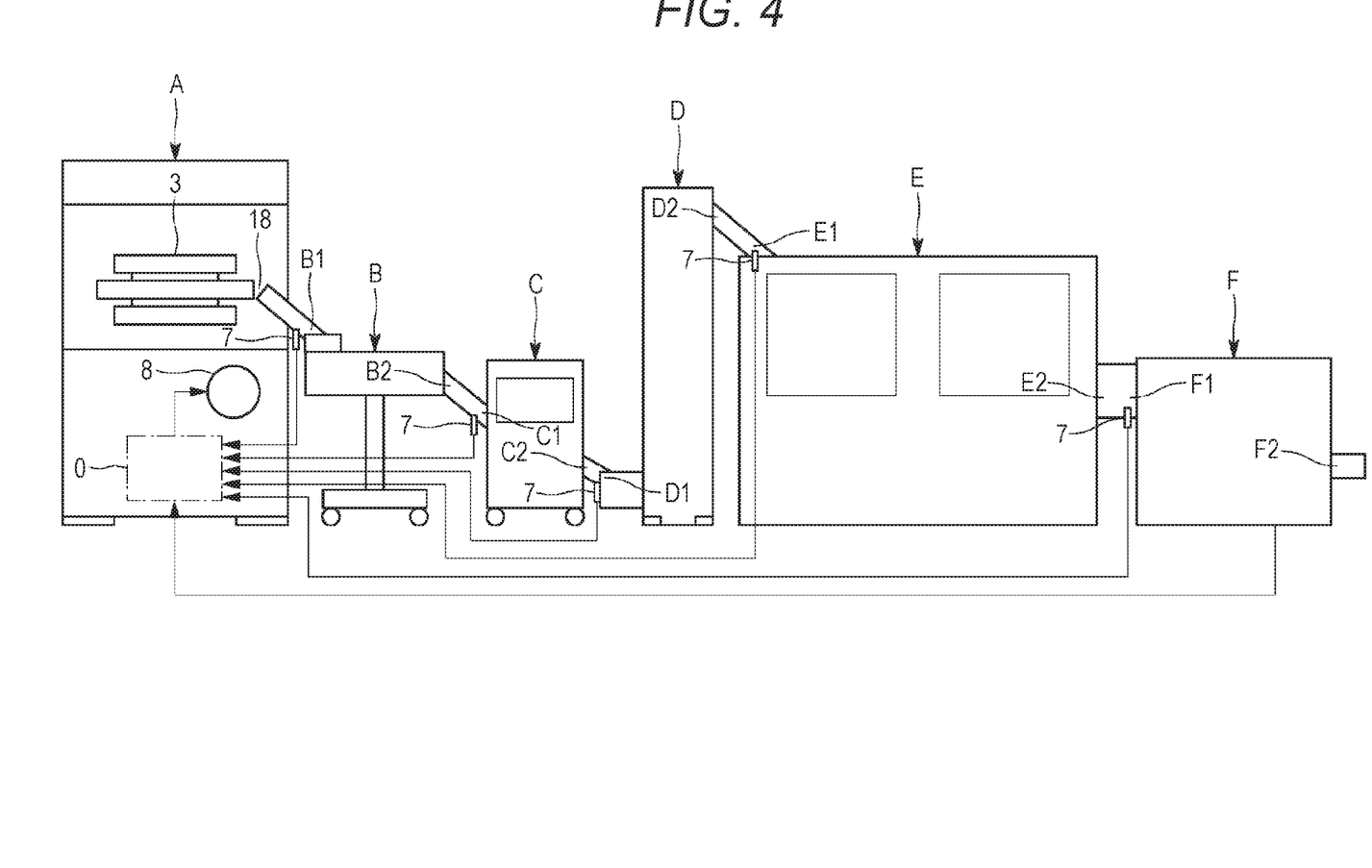
FIG. 4 is a schematic side view of a continuous processing system including the rotary compression-molding machine according to the exemplary embodiment and a peripheral device.

As shown exemplarily in FIG. 4, at least one of peripheral devices B to F configured to apply post-treatment to a molded product is disposed downstream of the molding machine A according to the exemplary embodiment, to conduct continuously, with no interruption, production of a molded product by the molding machine A and post-treatment by the peripheral device B, C, D, E, or F. Specific examples of such post-treatment include removing a powdery material adhering to the surface of a molded product, detecting any metal piece erroneously included in a molded product, printing or engraving on the surface of a molded product, checking at least one of properties such as weight, thickness, density, hardness, outer appearance, and composition of a molded product. Examples of the peripheral devices B to F that are configured to conduct such post-treatment and are disposed downstream of the molding machine A configured to produce a molded product include a powdery material remover, a metal detector, a printer, an engraving device, and a molded product property checker.

FIG. 4 exemplifies a powdery material remover B, a metal detector C, a lift D, a printer E, and a checker F, which are disposed downstream of the molding machine A and are aligned in the mentioned order. The powdery material remover B receives, at an inlet B1, a molded product dropped at the molded products collecting position 18 of the molding machine A, removes a powdery material adhering to the surface of the received molded product, and discharges the molded product at an outlet B2. The powdery material remover B scrapes a powdery material on the surface of the molded product with an incorporated brush, or removes the powdery material on the surface of the molded product with sprayed air.

The metal detector C receives, at an inlet C1, the molded product dropped from the outlet B2 of the powdery material remover B, detects any metal piece erroneously included in the received molded product, and discharges, at an outlet C2, the molded product including no metal piece.

The lift D receives, at an inlet D1, the molded product dropped from the outlet C2 of the metal detector C, lifts the received molded product upward, and discharges, at an outlet D2 located at a higher level than the inlet D1, the molded product. The lift D can be configured to blow, with air, the molded product upward from the inlet D1 to the outlet D2, or can include a mechanical convey mechanism configured to convey the molded product from the inlet D1 to the outlet D2 with a bucket lifter, a belt conveyer, or a member reciprocating in a path.

The printer E receives, at an inlet E1, the molded product dropped from the outlet D2 of the lift D, prints or engraves on the surface of the received molded product, and discharges the molded product at an outlet E2. The printer E can be configured to irradiate the surface of the molded product with laser light or the like to color or carve the surface of the molded product, or can be an ink jet printer configured to apply pigment to the surface of the molded product.

The checker F receives, at an inlet F1, the molded product discharged from the outlet E2 of the printer E, checks at least one of the properties such as weight, thickness, density, hardness, outer appearance, and composition of the received molded product, and discharges the checked molded product at an outlet F2. The checker F can be configured to check the properties of the molded product in accordance with any appropriate specific manner, and can have any one of various known modes.

At least one of the inlets B1 to F1 or the outlets B2 to F2 of the peripheral devices B to F has a sensor 7 configured to detect an amount of molded products stuck at the corresponding one of the inlets B1 to F1 and the outlets B2 to F2. The sensor 7 can be a contact sensor configured to contact to sense a molded product so as to detect an amount of stuck molded products, or can be a contactless sensor configured to irradiate the molded product with an infrared wave, a different light wave, or an electromagnetic wave to sense the molded product and detect the amount of stuck molded products. Still alternatively, the sensor 7 can be a gravimetric sensor configured to measure a weight of molded products stuck at the corresponding one of the inlets B1 to F1 and the outlets B2 to F2 to detect the amount of the stuck molded products.

A controller 0 of the molding machine A according to the exemplary embodiment is configured to control operation of the molding machine A. Examples of the controller 0 include a programmable controller, as well as a microcomputer system, a personal computer, and a work station each of which includes a processor, a memory, an auxiliary storage device (e.g., a flash memory), an input/output interface, and the like. The controller 0 reads a program preliminarily stored in the auxiliary storage device to the processor by way of the memory, causes the processor to decode the program, and controls the molding machine A.

Specifically, the controller 0 refers to the amount of stuck molded products of at least one of the inlets B1 to F1 or the outlets B2 to F2 of the peripheral devices B to F detected by the sensor 7, and reduces a rotational speed of the turret 3 and the punches 5 and 6 of the molding machine A (i.e., a rotational speed of the motor 8) as the amount of the stuck molded products is larger. The controller 0 alternatively reduces the rotational speed of the turret 3 and the punches 5 and 6 of the molding machine A if the amount of stuck molded products exceeds a predetermined amount, from the rotational speed in a case where the amount is not more than the predetermined amount. In a case where the system includes a plurality of sensors 7, the controller 0 is preferably configured to refer to the largest one of the amounts of stuck molded products detected by the sensors 7.

It is obvious that a flow rate, or the number of molded products per unit time, fed from the molding machine A to the peripheral devices B to F decreases as the rotational speed of the turret 3 and the punches 5 and 6 of the molding machine A reduces. In contrast, the number of molded products fed from the molding machine A to the peripheral devices B to F per unit time increases as the rotational speed of the turret 3 and the punches 5 and 6 increases.

In a case where any of the peripheral devices B to F fails to smoothly conduct post-treatment or is fed with an excessive amount of molded products for capacity or speed of the post-treatment by the peripheral devices B to F and molded products are stuck at a corresponding one of the inlets B1 to F1 and the outlets B2 to F2 of the peripheral devices B to F, such control reduces the rotational speed of the molding machine A configured to discharge molded products to reduce the amount of molded products to be fed to the peripheral devices B to F per unit time. The control thus effectively prevents molded products from being overflown at corresponding one of the inlets B1 to F1 and the outlets B2 to F2 of the peripheral devices B to F.

The controller 0 according to the exemplary embodiment normally keeps rotation of the turret 3 and the punches 5 and 6 of the molding machine A even in a case where the sensor 7 detects stuck molded products at any of the inlets B1 to F1 and the outlets B2 to F2 of the peripheral devices B to F. The controller 0 simply reduces the rotational speed of the turret 3 and the punches 5 and 6 and normally keeps operation of the molding machine A even when molded products are stuck at any of the inlets B1 to F1 and the outlets B2 to F2 of the peripheral devices B to F.

In a case where the controller 0 reduces the rotational speed of the turret 3 and the punches 5 and 6 of the molding machine A to be lower than ordinary or normal speed in accordance with the amount of stuck molded products, the controller 0 recovers the rotational speed of the turret 3 and the punches 5 and 6 to the ordinary or normal speed if the amount of the stuck molded products detected by the sensor 7 becomes not more than the predetermined amount within a predetermined period from the reduction in speed. In another case where the amount of stuck molded products detected by the sensor 7 does not decrease to be not more than the predetermined amount after the predetermined period from the reduction in the rotational speed of the turret 3 and the punches 5 and 6, the controller 0 can exceptionally stop rotation of the turret 3 and the punches 5 and 6 (i.e., stop the molding machine A) to cope with such emergency.

Meanwhile, in a case where the amount of stuck molded products detected by the sensor 7 is less than a certain amount and molded products are hardly or never stuck at any of the inlets B1 to F1 and the outlets B2 to F2 of the peripheral devices B to F (i.e., the peripheral devices B to F do not conduct full post-treatment), the controller 0 can be configured to increase the rotational speed of the turret 3 and the punches 5 and 6 of the molding machine A to be higher than the ordinary or normal speed. The controller 0 can alternatively be configured to increase the rotational speed of the turret 3 and the punches 5 and 6 as the amount of stuck molded products detected by the sensor 7 is smaller. Such control achieves further increase in an amount of produced molded products.

The controller 0 according to the exemplary embodiment is configured to regulate the rotational speed of the turret 3 and the punches 5 and 6 in accordance with a quality of a molded product discharged from the molding machine A.

In a case where the controller 0 finds a defective quality of a molded product discharged from the molding machine A due to a fast rotational speed of the turret 3 and the punches 5 and 6 (i.e., fast tableting speed of the molding machine A) (and the quality is expected to be improved by reduction in tableting speed), the controller 0 reduces the rotational speed of the turret 3 and the punches 5 and 6 by reducing the rotational speed of the motor 8 of the molding machine A. In a case where the checker F detects that a density or a hardness of a molded product discharged from the molding machine A is more than a reference value or detects capping or lamination of a molded product and transmits to the controller 0 a signal indicating such a defect, the controller 0 reduces a current rotational speed of the turret 3 and the punches 5 and 6 to extend a period of pressing the powdery material in the die bores 4 by the punches 5 and 6 so as to correct the density or the hardness of molded products or prevent capping or lamination.

In a contrary case where defective quality of a molded product is caused by low tableting speed of the molding machine A (and the quality is expected to be improved by increase in tableting speed), the controller 0 increases the rotational speed of the turret 3 and the punches 5 and 6 by increasing the rotational speed of the motor 8 of the molding machine A. For example, when the checker F detects that the density or the hardness of a molded product discharged from the molding machine A is less than the reference value or detects binding or sticking of a molded product and transmits to the controller 0 a signal indicating such a defect, the controller 0 increases the current rotational speed of the turret 3 and the punches 5 and 6 to shorten the period of pressing the powdery material in the die bores 4 by the punches 5 and 6 so as to correct the density or the hardness of molded products or prevent binding or sticking.

When the controller 0 reduces the rotational speed of the turret 3 and the punches 5 and 6 of the molding machine A to be lower than the ordinary or normal speed in accordance with a defective quality of a molded product, the controller 0 recovers the rotational speed of the turret 3 and the punches 5 and 6 to the ordinary or normal speed if the quality of a molded product is improved within a predetermined period from the reduction in speed. Similarly, when the controller 0 increases the rotational speed of the turret 3 and the punches 5 and 6 to be higher than the ordinary or normal speed but the quality of a molded product is improved within the predetermined period from the increase in speed, the controller 0 reduces the rotational speed of the turret 3 and the punches 5 and 6 to the ordinary or normal speed. If quality of a molded product is not improved after the predetermined period from reduction or increase in the rotational speed of the turret 3 and the punches 5 and 6, then the controller 0 can exceptionally stop rotation of the turret 3 and the punches 5 and 6 (i.e., stop the molding machine A, to cope with such emergency).

The controller 0 can alternatively increase the rotational speed of the turret 3 and the punches 5 and 6 of the molding machine A while molded products have no quality defect and reduce the rotational speed of the turret 3 and the punches 5 and 6 upon sensing a defective quality of a molded product.

The exemplary embodiment provides a controller 0 of a rotary compression-molding machine A configured to rotate a turret 3 including a table 31 having a die bore 4, and punch retaining portions 32 and 33 vertically slidably retaining punches 5 and 6 disposed above and below the die bore 4 along with the punches 5 and 6 to compress a powdery material filled in the die bore 4 with the punches 5 and 6 and obtain a molded product. The controller 0 is configured to detect an amount of stuck molded products at an inlet B1, C1, D1, E1, or F1 configured to receive a molded product or an outlet B2, C2, D2, E2, or F2 configured to discharge the molded product subjected to predetermined post-treatment, of a peripheral device B, C, D, E, or F disposed downstream of the molding machine A and configured to apply the post-treatment to the molded product discharged from the molding machine A, and regulate the rotational speed of the turret 3 and the punches 5 and 6 of the molding machine A in accordance with the detected amount of the stuck molded products. The exemplary embodiment achieves inhibiting molded products from being stuck or overflown in a continuous processing system including the rotary compression-molding machine A and the peripheral device B, C, D, E, or F disposed downstream of the molding machine A.

The exemplary embodiment also provides a controller 0 of a rotary compression-molding machine A configured to rotate a turret 3 including a table 31 having a die bore 4, and punch retaining portions 32 and 33 vertically slidably retaining punches 5 and 6 disposed above and below the die bore 4 along with the punches 5 and 6 to compress a powdery material filled in the die bore 4 with the punches 5 and 6 and obtain a molded product. The controller 0 is configured to regulate the rotational speed of the turret 3 and the punches 5 and 6 of the molding machine A in accordance with the quality of the molded product discharged from the molding machine A. The exemplary embodiment achieves maintaining the quality of the molded product fed from the molding machine A in the continuous processing system including the rotary compression-molding machine A and the peripheral device B, C, D, E, or F disposed downstream of the molding machine A.

The controller 0 according to the exemplary embodiment normally keeps operation of the molding machine A even when molded products are stuck at the inlet B1, C1, D1, E1, or F1 or the outlet B2, C2, D2, E2, or F2 of the peripheral device B, C, D, E, or F or a molded product has defective quality. Once rotation of the rotary compression-molding machine A is stopped, weight, hardness, thickness, and the like of produced molded products will not satisfy required property values for a while after the molding machine A restarts operation, and such molded products will have to be discarded. Particularly in cases where the molding machine A is large and includes large numbers of the die bores 4 and the punches 5 and 6 and where the molding machine A operates at a high rotational speed of the turret 3, the number of molded products to be discarded will be large. The controller 0 according to the exemplary embodiment is configured to reduce loss of molded products that would be caused for a certain period right after a restart of the molding machine A.

The invention is not limited to the exemplary embodiment detailed above. In particular, the peripheral devices B to F disposed downstream of the rotary compression-molding machine A are not limited in type and number to those shown in FIG. 4. In a case where the lift has a function of removing a powdery material adhering to the surface of a molded product, the system does not need to include the powdery material remover. Furthermore, the system does not need to include the printer if a molded product is appropriately engraved on the surface while the molded product is compression-molded by the punches of the molding machine A and printing or engraving does not need to be applied afterward to the molded product discharged from the molding machine A. The checker F configured to check a property of a molded product or the like may not be disposed downstream of the molding machine A.

Alternatively, at least one of the inlets B1 to F1 or the outlets B2 to F2 of the peripheral devices B to F may have a sensor 7 configured to detect a flow rate of molded products, i.e., count the number of the molded products per unit time, at a corresponding one of the inlets B1 to F1 and the outlets B2 to F2, and the controller 0 may be configured to regulate the rotational speed of the turret 3 and the punches 5 and 6 of the molding machine A in accordance with the flow rate of the molded products detected by the sensor 7. In this case, the rotational speed of the turret 3 and the punches 5 and 6 of the molding machine A (i.e., the rotational speed of the motor 8) is reduced as the flow rate of the molded products is larger at the corresponding one of the inlets B1 to F1 and the outlets B2 to F2 of the peripheral devices B to F. Alternatively, when the flow rate of the molded products exceeds a predetermined value at the corresponding one of the inlets B1 to F1 and the outlets B2 to F2 of the peripheral devices B to F, the controller 0 reduces the rotational speed of the turret 3 and the punches 5 and 6 in comparison to the case where the flow rate does not exceed the predetermined value. In a case where the system includes a plurality of sensors 7, the controller 0 is preferably configured to refer to the largest one of the flow rates of molded products detected by the sensors 7.

The controller 0 also preferably regulates the rotational speed of the turret 3 and the punches 5 and 6 of the molding machine A in accordance with numerical comparison between a flow rate of molded products discharged from the molding machine A (i.e., the number of molded products produced by the molding machine A per unit time) and a flow rate of molded products at any of the inlets B1 to F1 and the outlets B2 to F2 of the peripheral devices B to F.

Figure 5:
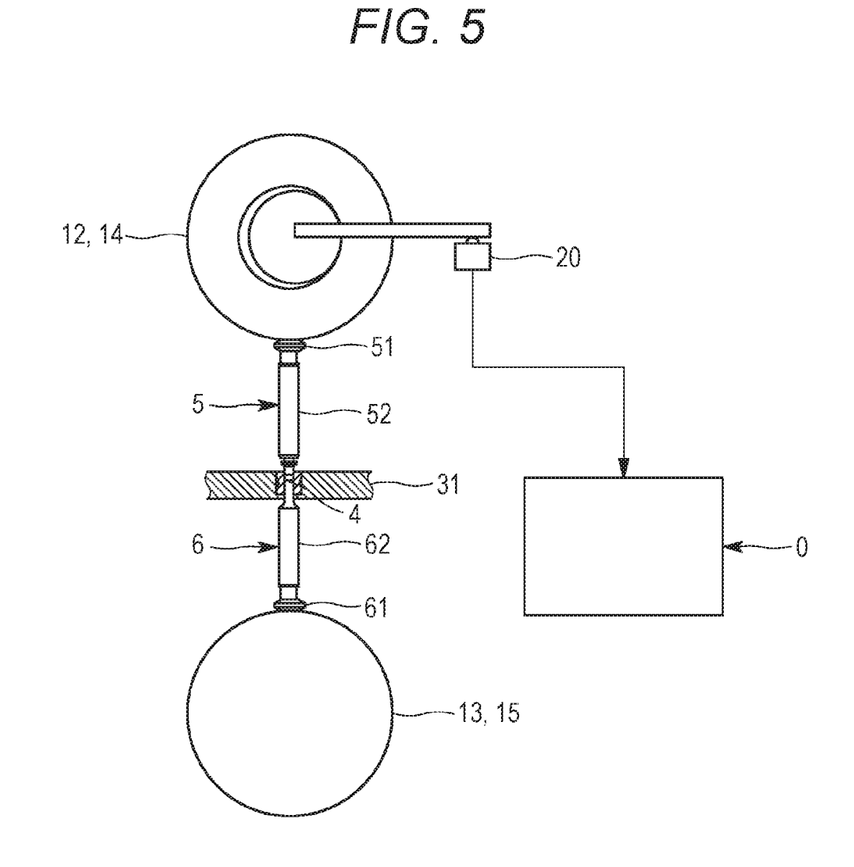
FIG. 5 is a configuration diagram of rolls and load cells included in the rotary compression-molding machine according to the exemplary embodiment.

As shown exemplarily in FIG. 5, the upper rolls 12 and 14 of the molding machine A each have a load cell 20 configured to detect pressure applied to compress the powdery material in the die bore 4 by the rolls 12 to 15 via the punches 5 and 6. The controller 0 receives a signal transmitted from the load cell 20 at each of the rolls 12 to 15 to find a magnitude of pressure applied to compress the powdery material by the preliminarily compression rolls 12 and 13 (e.g., a preliminary compression pressure) and a magnitude of pressure applied to compress the powdery material by the substantial compression rolls 14 and 15 (e.g., a substantial compression pressure). Signals outputted from each of the load cells 20 form a pulse signal train having a peak when each of the pairs of punches 5 and 6 compresses the powdery material in a corresponding one of the die bores 4 with maximum pressure. The controller 0 thus counts the number of pulse trains to find the number of molded products produced by the molding machine A per unit time.

When a difference between the number of molded products produced by the molding machine A per unit time and the flow rate of molded products at any of the inlets B1 to F1 and the outlets B2 to F2 of the peripheral devices B to F increases to be not less than a predetermined value, or even when the difference is less than the predetermined value, the controller 0 increases or reduces the rotational speed of the turret 3 and the punches 5 and 6 to reduce the difference. Specifically, the controller 0 reduces the rotational speed of the turret 3 and the punches 5 and 6 if the former value is more than the latter value, and increases the rotational speed of the turret 3 and the punches 5 and 6 if the former value is less than the latter value.

A device other than the checker F, particularly the molding machine A itself, can be configured to detect any quality defect of a molded product. For example, the molding machine A includes a camera sensor or the like, which is disposed in a region between the molded product unloading portion 16 and the feeder X and is configured to detect a state of the inner circumferential surface of the die bore 4, the lower end surface of the punch 5, or the upper end surface of the punch 6. The controller 0 analyzes an image captured by the camera sensor, of the inner circumferential surface of the die bore 4 or the end surface of the punch 5 or 6 to check whether or not a powdery material adheres to the inner circumferential surface of the die bore 4 or the end surface of the punch 5 or 6 (i.e., whether or not a molded product is partially cracked due to binding or sticking). The controller 0, which has found binding or sticking in such a manner, increases or reduces the current rotational speed of the turret 3 and the punches 5 and 6 to inhibit binding and sticking.

In a case where the feeder X configured to fill the die bore 4 with a powdery material includes an agitating rotor configured to agitate the powdery material, the controller 0 can be configured to control the rotational speed of the turret 3 and the punches 5 and 6 as well as the rotational speed of the agitating rotor. The controller 0 thus configured increases the rotational speed of (e.g., a motor configured to drive) the agitating rotor of the agitated feeder X as the rotational speed of the turret 3 and the punches 5 and 6 increases. Alternatively, the controller 0 increases the rotational speed of the agitating rotor if the turret 3 and the punches 5 and 6 have a high rotational speed, in comparison to a case where the turret 3 and the punches 5 and 6 have a lower rotational speed.

The controller 0 can be configured to control a processing speed of the peripheral devices B to F (particularly the printer E that is likely to cause molded products to be stuck), as well as to control the rotational speed of the turret 3 and the punches 5 and 6 of the molding machine A. Specifically, the controller 0 increases speed of a post-treatment by the peripheral devices B to F as the turret 3 and the punches 5 and 6 have a higher rotational speed. Alternatively, the controller 0 increases a processing speed of the peripheral devices B to F if the turret 3 and the punches 5 and 6 have the higher rotational speed, in comparison to a case where the turret 3 and the punches 5 and 6 have the lower rotational speed.

Furthermore, specific configurations of the respective portions can be modified in various manners without departing from the spirit of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A controller of a rotary compression-molding machine configured to rotate a turret including a table including a die bore, and a plurality of punch retaining portions that vertically and slidably retain a plurality of punches disposed above and below the die bore to compress a powdery material filled in the die bore with the punches and to obtain a molded product, the controller being programmed to detect, with a sensor, an amount of stuck molded products or a flow rate of molded products at an inlet of a peripheral device, the inlet being configured to receive a molded product, and at an outlet of the peripheral device, the outlet being configured to discharge the molded product subjected to a predetermined post-treatment in the peripheral device, the peripheral device being disposed downstream of the molding machine and being configured to apply the post-treatment to the molded product discharged from the molding machine, the controller further being programmed to regulate a rotational speed of the turret and the punches of the molding machine in accordance with the detected amount of the stuck molded products or the detected flow rate of the molded products.

2. The controller according to claim 1, wherein the controller is further programmed to reduce the rotational speed of the turret and the punches of the molding machine as the amount of the stuck molded products is larger at one of the inlet or the outlet of the peripheral device compared to another one of the inlet or the outlet of the peripheral device, or to reduce the rotational speed of the turret and the punches of the molding machine when the amount of the stuck molded products exceeds a predetermined amount at the inlet or the outlet of the peripheral device in comparison to a case where the amount does not exceed the predetermined amount.

3. The controller according to claim 1, wherein the controller is further programmed to regulate the rotational speed of the turret and the punches of the molding machine in accordance with a quality of the molded product discharged from the molding machine.

4. The controller according to claim 2, wherein the controller is further programmed to regulate the rotational speed of the turret and the punches of the molding machine in accordance with a quality of the molded product discharged from the molding machine.

5. A controller of a rotary compression-molding machine configured to rotate a turret including a table including a die bore, and a plurality of punch retaining portions that vertically and slidably retain a plurality of punches disposed above and below the die bore to compress a powdery material filled in the die bore with the punches and to obtain a molded product, the controller being programmed to regulate a rotational speed of the turret and the punches of the molding machine in accordance with a quality of the molded product discharged from the molding machine after the quality of the molded product, discharged from the molding machine, changes with a speed that the rotary compression-molding machine discharges the molded product.

6. The controller according to claim 5, wherein the controller is further programmed to detect an amount of stuck molded products or a flow rate of molded products at an inlet of a peripheral device, the inlet being configured to receive a molded product, or at an outlet of the peripheral device, the outlet being configured to discharge the molded product subjected to a predetermined post-treatment in the peripheral device disposed downstream of the molding machine.

7. The controller according to claim 6, wherein the controller is further programmed to apply the post-treatment to the molded product discharged from the molding machine.

8. The controller according to claim 6, wherein the controller is further programmed to regulate the rotational speed of the turret and the punches of the molding machine in accordance with the detected amount of the stuck molded products.

9. The controller according to claim 6, wherein the controller is further programmed to regulate the rotational speed of the turret and the punches of the molding machine in accordance with the detected flow rate of the molded products.

10. The controller according to claim 6, wherein the controller is further programmed to reduce the rotational speed of the turret and the punches of the molding machine when the amount of the stuck molded products exceeds a predetermined amount at the inlet or the outlet of the peripheral device in comparison to a case where the amount does not exceed the predetermined amount.

11. The controller according to claim 6, wherein the controller is further programmed to detect the amount of the stuck molded products or the flow rate of the molded products at the inlet of the peripheral device and at the outlet of the peripheral device.

12. The controller according to claim 5, wherein the controller is further programmed to change the speed that the rotary compression-molding machine discharges the molded product based on the quality of the molded product discharged from the molding machine depending on the rotational speed of the turret and the punches of the molding machine.

13. The controller according to claim 5, wherein, after the controller detects that the quality of the molded product discharged from the molding machine is defective due to the rotational speed of the turret and the punches being more than a predetermined rotational speed, the controller is further programmed to reduce the rotational speed of the turret and the punches.

14. The controller according to claim 13, wherein, after the controller detects that the quality of the molded product discharged from the molding machine is defective due to the rotational speed of the turret and the punches being less than another predetermined rotational speed, the controller is further programmed to increase the rotational speed of the turret and the punches.

15. The controller according to claim 1, wherein the controller is further programmed to detect, with the sensor, the amount of stuck molded products at the inlet of the peripheral device and at the outlet of the peripheral device.

16. The controller according to claim 15, wherein controller is further programmed to detect, with the sensor, the flow rate of molded products at the inlet of the peripheral device and at the outlet of the peripheral device.

17. The controller according to claim 1, wherein at least another peripheral device, which applies another post-treatment to the molded product discharged from the molding machine, is disposed between the rotary compression-molding machine and the peripheral device.

18. The controller according to claim 17, wherein the controller is further programmed to detect, with the sensor, the amount of stuck molded products or the flow rate of molded products at an inlet of said another peripheral device and at an outlet of said another peripheral device.

19. The controller according to claim 1, wherein the controller is further programmed to regulate a rotational speed of the turret and the punches of the molding machine after a quality of the molded product, discharged from the molding machine, changes with a speed that the rotary compression-molding machine discharges the molded product.

20. The controller according to claim 19, wherein, after the controller detects that the quality of the molded product discharged from the molding machine is defective due to the rotational speed of the turret and the punches being out of a predetermined rotational speed range, the controller is further programmed to change the rotational speed of the turret and the punches.

* * * * *